US007149962B1

(12) United States Patent  
Davis et al.

(10) Patent No.: US 7,149,962 B1
(45) Date of Patent: Dec. 12, 2006

(54) SYSTEM AND METHOD FOR PROVIDING A GAUGE TABLE

(75) Inventors: Thomas J. Davis, Cary, IL (US); Rick R. Roberts, Chesterton, IL (US); Charlene R. Cysz, Oak Lawn, IL (US); Arthur J. Kozlowski, Oak Forest, IL (US)

(73) Assignee: General Electric Railcar Services Corporation, Chicago, IL (US)

( * ) Notice: Subject to any disclaimer, the term of this patent is extended or adjusted under 35 U.S.C. 154(b) by 425 days.

(21) Appl. No.: 10/086,284

(22) Filed: Mar. 1, 2002

(51) Int. Cl.
*G06F 15/00* (2006.01)

(52) U.S. Cl. ........................ 715/509; 715/500; 715/530
(58) Field of Classification Search ................ 715/509, 715/510, 500, 530; 702/156
See application file for complete search history.

(56) References Cited

U.S. PATENT DOCUMENTS

| | | | |
|---|---|---|---|
| 5,050,004 A * | 9/1991 | Morton, Jr. ................ 358/405 |
| 5,357,629 A * | 10/1994 | Dinnis et al. ............... 707/203 |
| 5,790,779 A * | 8/1998 | Ben-Natan et al. ........... 714/39 |
| 5,822,716 A * | 10/1998 | Morell et al. ................ 702/55 |
| 5,943,683 A * | 8/1999 | Yamaguchi ................. 711/114 |
| 5,970,488 A * | 10/1999 | Crowe et al. .................. 707/8 |
| 6,021,272 A * | 2/2000 | Cahill et al. ................ 717/147 |
| 6,072,771 A * | 6/2000 | Anderson et al. ........... 370/216 |
| 6,104,978 A * | 8/2000 | Harrison et al. ............ 701/207 |
| 6,122,640 A * | 9/2000 | Pereira .................... 707/103 R |
| 6,148,305 A * | 11/2000 | Ikegaya et al. ........... 707/104.1 |
| 6,176,883 B1 * | 1/2001 | Holloway et al. ........... 709/223 |
| 6,182,243 B1 * | 1/2001 | Berthe et al. ................. 714/38 |
| 6,213,135 B1 * | 4/2001 | Moulder ................ 134/167 R |
| 6,400,287 B1 * | 6/2002 | Ehrman ....................... 341/55 |
| 6,675,059 B1 * | 1/2004 | Scott ........................... 700/166 |
| 6,718,515 B1 * | 4/2004 | Conner et al. .............. 715/509 |
| 6,721,751 B1 * | 4/2004 | Furusho ..................... 707/100 |
| 6,725,032 B1 * | 4/2004 | Sheridan et al. ............ 455/419 |
| 6,769,162 B1 * | 8/2004 | Barich et al. ............. 29/402.01 |
| 6,782,339 B1 * | 8/2004 | Neeser et al. ............... 702/156 |
| 6,867,708 B1 * | 3/2005 | Darby et al. ................ 340/933 |
| 7,040,747 B1 * | 5/2006 | Kubota et al. .............. 347/101 |
| 2002/0013863 A1 * | 1/2002 | Kitagawa ....................... 710/5 |
| 2002/0133624 A1 * | 9/2002 | Hashem et al. ............. 709/243 |

OTHER PUBLICATIONS

Mei, Accurate, Automatic Temperature Measurement Reduces Tank Volume Errors, Oil & Gas Journal, vol. 90, Iss. 29, p. 105 3 pgs.*
Weigel, A Railroad Intermodal Capacity Model, ACM 1994, pp. 1229-1232.*
Ryan, The Future of Maritime Facility Designs and Operations, ACM 1998, pp. 1223-1227.*

* cited by examiner

*Primary Examiner*—Cong-Lac Huynh
(74) *Attorney, Agent, or Firm*—McDermott Will & Emery LLP

(57) ABSTRACT

The present invention is directed to a method and a system for providing a gauge table with a requested format capable of being accessed via the Internet for a railcar tank based on a request and an error report generated from data identifying the railcar and the gauge table file of the identified railcar.

18 Claims, 4 Drawing Sheets

SYSTEM AND METHOD FOR PROVIDING A GAUGE TABLE

FIELD OF THE INVENTION

The present invention relates to a system and a method for providing a gauge table. Specifically, the present invention provides a system and a method for providing customers access to a gauge table including a method of converting gauge table data into a format capable of being accessed via a computer network, such as, for example, the Internet.

BACKGROUND OF THE INVENTION

A gauge table is a numerical table that relates a volume of cargo to the distance between the shell-full level of the tankcar and the surface level of the cargo within the tankcar. Operators of tankcars use gauge tables to determine the volume of cargo carried by or removed from a tankcar. Every tankcar has two associated gauge tables, an image gauge table and an outage gauge table. The image gauge table relates the distance between the shell-full level of the tankcar and the surface level of the cargo to the volume of cargo within the tankcar. The outage gauge table relates the distance between the shell-full level of the tankcar and the surface level of the cargo to the volume of remaining cargo capacity within the tankcar. Image gauge tables are commonly used to determine the current volume of cargo held by a tankcar. Outage gauge tables are commonly used to determine the volume of cargo that has been removed from a tankcar. The volume of cargo removed from a tankcar can be calculated using a gauge table by subtracting the initial volume of remaining cargo capacity from the current volume of remaining cargo capacity. Image and outage gauge tables can be compiled in either an ascending or descending format.

Every tankcar has a unique image gauge table and a unique outage gauge table. Various factors such as the tank style, the shell-full capacity, the volume of any internal components, the lining thickness, the tank diameter, the center diameter, and the manway volume all contribute to the uniqueness of each tankcar's gauge tables.

Tankcars are commonly leased or sold to railcar operators. Consequently, railcar operators commonly request copies of gauge tables from railcar lessors and manufacturers. In the past, railcar lessors and manufacturers provided printed gauge tables to railcar operators. However, the conversion process relating the surface level of the cargo to the image and/or outage levels was time intensive and resulted in an unacceptably high rate of errors in the converted gauge tables.

Inaccurate gauge tables and time lost waiting for an accurate gauge table cost the railcar operators money. For example, inaccurate gauge tables may cause an operator to fill a tankcar to less than full capacity resulting in a need for a greater number of tankcars. Alternatively, an inaccurate gauge table may result in overfilling tankcars, wasting product and presenting a danger or nuisance to workers. Moreover, if the tankcar is emptied in a number of different locations, an inaccurate gauge table may result in overcharging or undercharging for delivered cargo, or under-delivery or over-delivery of commodity.

FIG. 1 illustrates a prior art process for providing a gauge table to railcar operators or other customers. As shown in FIG. 1, when a customer made a request for a gauge table, that request was communicated to a customer service department. The customer service department determined whether an accurate copy of the requested gauge table existed by searching files either manually or via a computer. If an accurate copy did exist, a printed copy of the gauge table was sent to the customer. However, if an accurate copy of the requested gauge table did not exist, a request to generate the requested gauge table was sent by the customer service department to an engineering department. The engineering department would generate the requested gauge table and send a printed copy of it to the customer service department.

The customer service department collected the printed gauge tables to be sent to an outsource supplier for conversion into a format suitable to be sent to the customer. However, it was not economical to send the gauge tables to the outsource supplier for conversion until at least approximately 50 printed gauge tables were collected. Often collecting at least approximately 50 printed gauge tables took much time, perhaps weeks. Once the outsource supplier received the gauge tables, the outsource supplier converted the printed gauge tables into a format suitable to be sent to the customer and capable of being stored electronically. The converted gauge tables were then sent by the outsource supplier to an information technology department.

The information technology department first tested the converted gauge tables for format and content errors. After the converted gauge table was checked for accuracy, the information technology department uploaded the converted gauge tables into a computer network that was accessible by the customer service department. After the gauge tables were checked and uploaded, the information technology department informed the customer service department that the gauge table was available. Finally, the customer service department would access the gauge table, print a copy of the gauge table, and send the copy of the gauge table to the customer.

This process often required the customer to wait a significant period of time for a gauge table. Moreover, the conversion process employed by the outsource supplier was susceptible to a high rate of errors. Consequently, through the prior art process, a customer often waited weeks to receive an inaccurate gauge table. Additionally, the customers were not able to access the data files generated by the engineering department; the customers could only receive the information in printed "hard-copy" form. Moreover, often the gauge table on file with the customer service department was in a format other than the format requested by the customer. The conversion process was no less inefficient, redundant, or error prone than the process illustrated in FIG. 1.

Accordingly, a system and a method are needed that will provide customers access to accurate gauge table information in a shorter time period in a format that is readily usable by the customer. Moreover, a system and method are needed that further overcome the problems associated with the prior art process, and other processes commonly used to provide gauge tables to customers.

SUMMARY OF THE INVENTION

The present invention relates to a system and a method for providing a gauge table. Specifically, the present invention provides a system and a method for providing customers access to a gauge table including a method of converting gauge table data into a format capable of being accessed via a computer network, such as, for example, the Internet.

It is, therefore, an advantage of the present invention to provide a system and a method for providing accurate gauge tables. Moreover, it is an advantage of the present invention to provide a system and a method for generating a gauge table in a format suitable for customer use.

In addition, it is an advantage of the present invention to provide a system and a method for providing customers with a gauge table accessible via the Internet. Further, it is an advantage of the present invention to provide a method of converting a gauge table into a format suitable to be displayed on the Internet. Moreover, it is an advantage of the present invention to provide a method of providing customers with a gauge table that may be downloaded to the customer's electronic file storage system via the Internet.

Additional features and advantages of the present invention are described in, and will be apparent from, the detailed description of the presently preferred embodiments and from the drawings.

DETAILED DESCRIPTION OF THE PREFERRED EMBODIMENTS

The present invention relates to a system and a method for providing a gauge table. Specifically, the present invention provides a system and a method for providing customers access to a gauge table including a method of converting gauge table data into a format capable of being accessed via a computer network, such as, for example, the Internet.

Figure 1A:
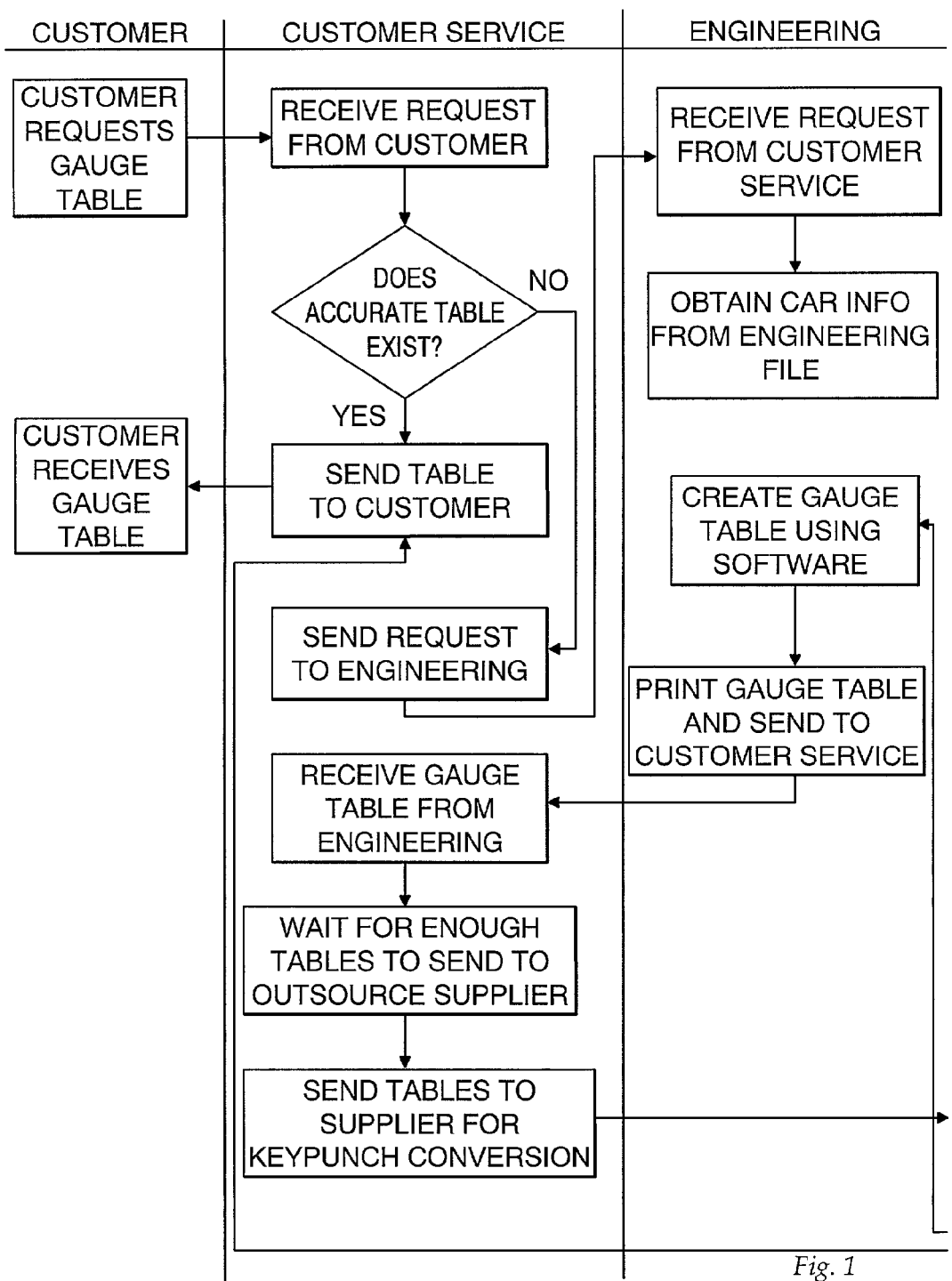
FIG. 1 illustrates an example of a prior art process for providing a gauge table to customers.
Figure 1A:
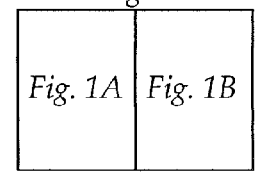
Figure 1B:
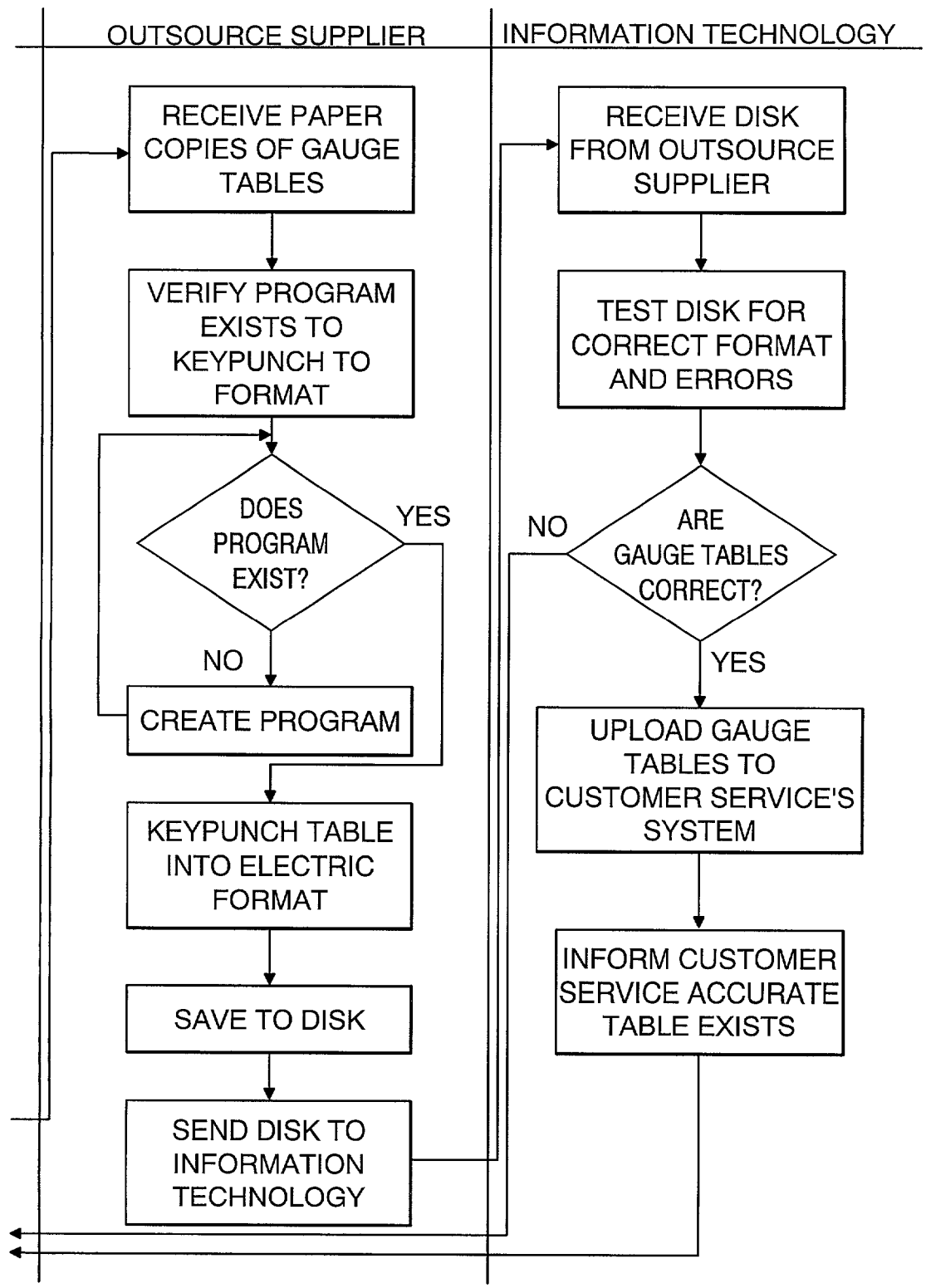
Figure 2:
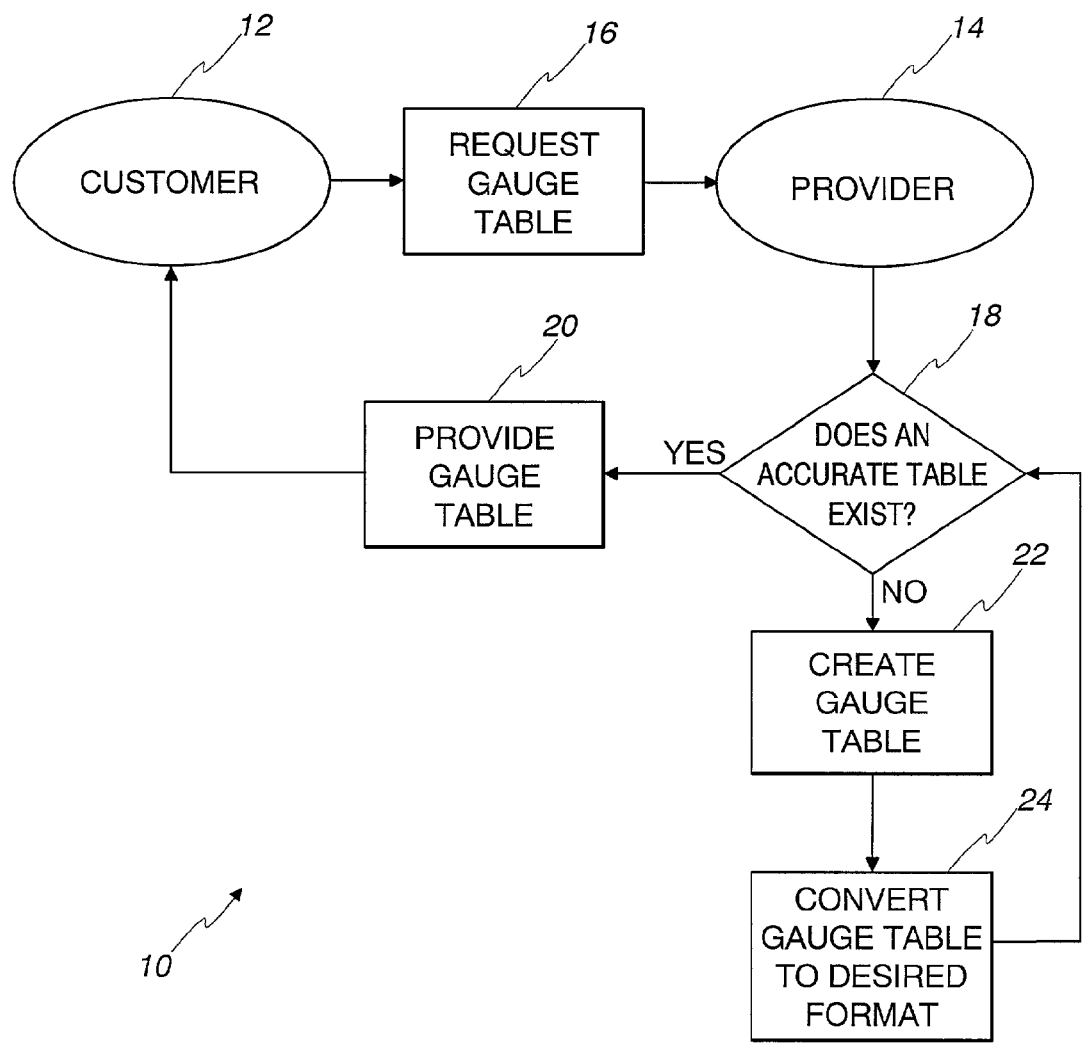
FIG. 2 illustrates a process for providing a gauge table to customers in an embodiment of the present invention.

Now referring to the figures, wherein like numerals refer to like features, FIG. 2 shows an embodiment of a system and method 10 for providing a gauge table of the present invention. As shown in FIG. 2 a customer 12 may request a gauge table from a provider 14 via step 16. Additionally, the customer 12 may request a plurality of gauge tables via step 16. The customer 12 may be any entity that may want a gauge table. The requested gauge table may be either an image gauge table or an outage gauge table. The provider 14 may be any entity that generates and provides gauge tables. For example, in an embodiment of the present invention, the customer 12 may be a tankcar purchaser and the provider 14 may be a tankcar manufacturer. In another embodiment of the present invention, the customer 12 may be a tankcar lessee and the provider 14 may be a tankcar lessor. Alternatively, the customer 12 and the provider 14 may be any other entities, including departments within a single entity, as may be apparent to one having ordinary skill in the art.

In an embodiment of the present invention, step 16 may include the customer 12 requesting a gauge table by way of verbal communication with the provider 14. In another embodiment of the present invention, the customer 12 may submit a request to the provider 14 via an electronic mail ("e-mail") communication. A form for submitting an e-mail communication to the provider 14 may be provided to the customer 12, to be readily downloadable on an Internet site. In yet another embodiment of the present invention, step 16 may automatically occur as a part of the customer 12 buying or leasing a railcar from the provider 14. For example, entering a new purchase or lease order for a railcar made by the customer 12 into a computer may trigger a program that completes step 16 by automatically sending a gauge table request to the provider 14. Alternatively, step 16 may be performed in any manner apparent to one skilled in the art.

Step 16 may include submitting information to the provider 14, such as, information relating to the tankcar for which the gauge table is being requested, the identity of the customer 12 that is requesting the gauge table, the format in which the customer 12 would like to receive the requested gauge table, or other information relevant to a gauge table request. For example, step 16 may include submitting information relating to the tankcar such as the internal diameter of the tank, the length of the tank, the capacity of the tank, the lining thickness, and other tankcar attributes. Step 16 may also include information relating to the customer 12 such as the customer's name, the customer's address, the customer's business, the customer's contract terms, and any other customer information apparent to one of ordinary skill in the art. Further, step 16 may include indicating whether the customer 12 is requesting an image or outage gauge table.

After step 16 has been completed, the provider 14 may determine whether an accurate gauge table exists via step 18. Step 18 may include accessing the requested gauge table from a gauge table storage means. The gauge table storage means may include a paper file, an electronic file, or any other storage means capable of storing a gauge table apparent to one skilled in the art. Further, step 18 may include determining whether the gauge table possessed by the provider 14 had previously been marked as an accurate gauge table suitable for use by the customer 12 via an audit program 34 as described below with reference to FIG. 3. For example, a date stamp may be used to indicate the date that the gauge table was deemed to be accurate. Alternatively, the accuracy of a gauge table may be determined and signified using any means that would be apparent to one skilled in the art. Step 18 may otherwise include any other method of determining whether an accurate gauge table already exists.

If the provider 14 determines that an accurate version of the requested gauge table exists via step 18, the provider 14 may provide the requested gauge table to the customer 12 via step 20. Step 20 may include providing the requested gauge table in an electronic and/or printed format. For example, the gauge table may be provided on an Internet or extranet page for the customer 12 to view. Alternatively, step 20 may include any other manner of transferring the gauge table information to the customer 12.

However, if the provider 14 determines that an accurate version of the requested gauge table does not exist via step 18, the provider 14 may create the requested gauge table via step 22. Step 22 may include any method of creating an accurate gauge table as would be apparent to one skilled in the art, including using gauge table creation software, spreadsheets, databases or any other information compilation software.

In a contemplated embodiment of step 22, an electronic storage means such as a computer database may be used to store the tankcar information for which the gauge table is being requested. Step 22 may include accessing the tankcar information stored on the computer database and using the tankcar information to generate a gauge table file using computer software. Alternatively, any software or other method of generating a gauge table file known in the art may be used to generate the requested gauge table file via step 22.

Once an accurate gauge table file is created via step 22 the provider 14 may convert the gauge table file into a format suitable for providing the gauge table to the customer 12 via step 24. Step 24 may include converting the gauge table created via step 22 into an electronic and/or printed format.

In a contemplated embodiment, the gauge table may be converted into a format suitable for making the gauge table available on an Internet page for the customer 12 to view, print, and/or download. Alternatively, in another embodiment, the gauge table may be converted into a format suitable for e-mailing to the customer 12. In yet another embodiment, the gauge table may be converted into a format suitable for printing and delivering to the customer 12. In still another contemplated embodiment, the gauge table may be displayed on an extranet. Moreover, the requested gauge table may be converted into any format requested by the customer 12 via any method apparent to one skilled in the art via step 24.

Once the requested gauge table has been converted via step 24, the provider 14 may then repeat the analysis of whether an accurate gauge table exists via step 18. Accordingly, after completing step 18 the provider 14 may proceed to either step 20 or step 22 as described above.

Figure 3:
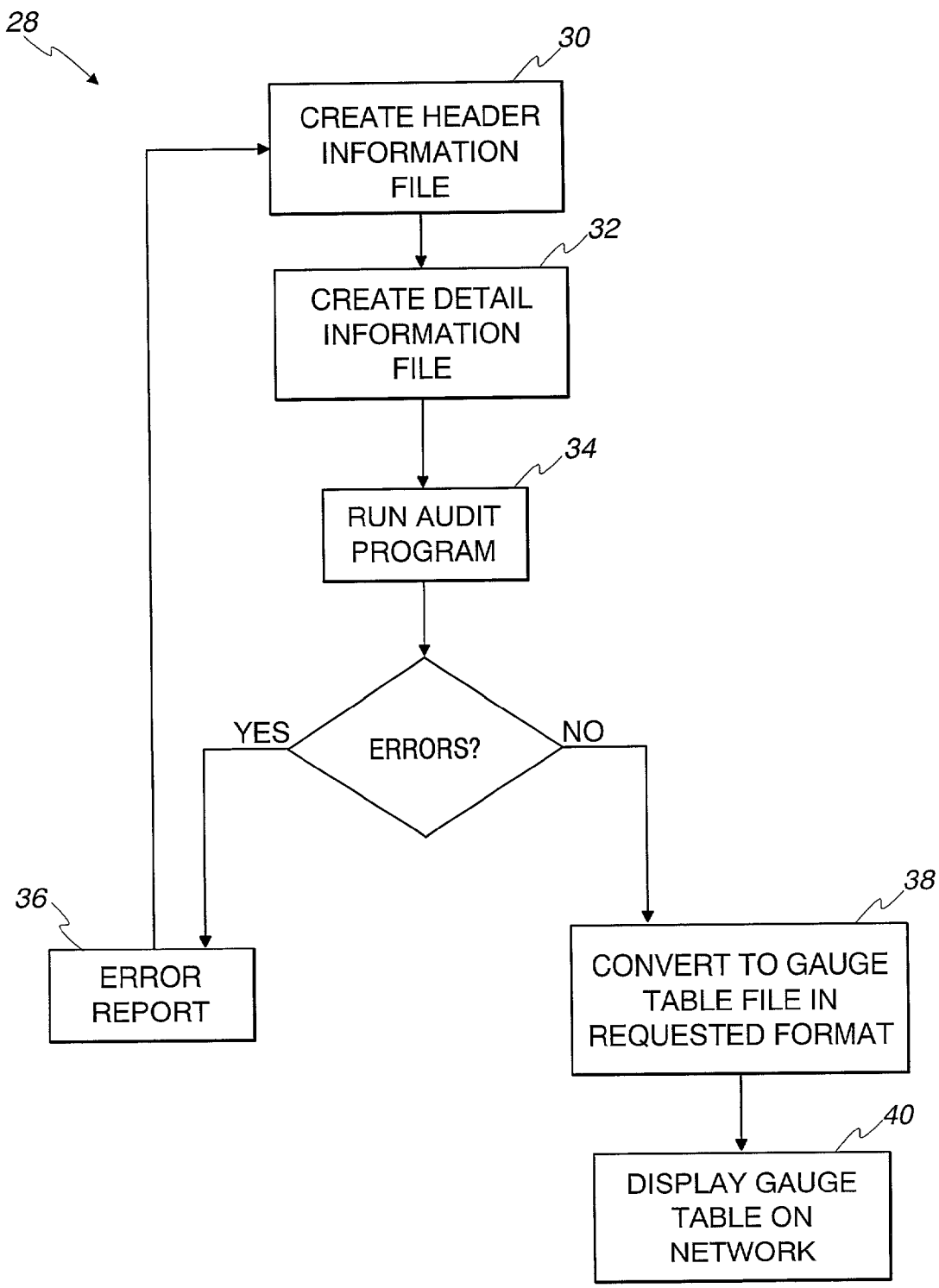
FIG. 3 illustrates a process for converting a gauge table to a format suitable for display on a computer network in an embodiment of the present invention.

A contemplated embodiment of steps 22 and 24 is described in detail with respect to FIG. 3 herein. FIG. 3 illustrates a process 28 designed to implement steps 22 and 24, as shown in FIG. 2, in an embodiment of the present invention. The process 28 shown in FIG. 3 is designed to convert gauge tables into a format suitable for display on the Internet or an extranet. However, the process 28 may be adapted to convert gauge tables into another format as requested by the customer 12 as would be apparent to one skilled in the art.

An operator may implement steps 22 and 24 via the process 28 shown in FIG. 3. As shown in FIG. 3, an operator may generate a header information file via step 30 for each of the tankcars for which a gauge table is to be created. The header information file may contain information identifying a tankcar and may be combined with the detail information file to create a gauge table as described below. The header information file may be a text file that includes, but is not limited to, customer information, the tankcar number and initial, the tankcar capacity, whether an image or outage table has been requested, and the e-mail address of the operator entering the header information. The header information file may be combined with a corresponding detail information file and displayed on a computer network extranet or the Internet as described below. Consequently, it may be desirable to store the header information file as a text file. Alternatively, the header information file may be stored in any format as would be apparent to one skilled in the art.

The operator may create a corresponding detail information file via step 32 for each of the tankcars for which the customer 12 has requested a gauge table. The detail information file may be a text file that includes, but is not limited to, the distance and volume data that comprises a gauge table and the operator's e-mail address. In an embodiment of the process 28 shown in FIG. 3, computer software is used to generate the detail information file containing the gauge table data via step 32. In a contemplated embodiment of the present invention, the gauge table generating software sold by Trinity Industries under the trademark Gauge Pro 2 may be used to create the detail information file as a text file. However, other gauge table creating software may be used as part of the process 28 of the present invention. Further, it is not necessary that the detail information file be created using computer software. For example, the detail information file may be created by the operator using word processing or spreadsheet software. Alternatively, formats other than text files may be used in accordance with the present invention.

Gauge Pro 2 operates by receiving data input by the operator, processing the data to generate a gauge table, and outputting the gauge table information in a text file. For example, the operator may input the tank style, the tank capacity, and the relevant tank dimensions as inputs into Gauge Pro 2. The relevant tank dimensions may include, but are not limited to, the volume of any internal components, the lining thickness, the tank diameter, the center diameter, and the manway volume. Gauge Pro 2 then generates and stores the gauge table data as a Gauge Pro 2 file. Once the gauge table data has been generated and stored, the operator may select the Gauge Pro 2 file containing the gauge table data through the Gauge Pro 2 program and select whether an image or an outage table is desired. Gauge Pro 2 then generates the requested gauge table in the selected format (i.e., image or outage) and outputs the data in a text file. In some applications of the process 28, it may be desirable to generate both an image and an outage table, such as, for example, when the gauge tables are to be stored in a gauge table database.

By way of explanation, Gauge Pro 2 is capable of storing gauge table data for a plurality of tankcars. Consequently, the operator may input information for a single tankcar or for a plurality of tankcars before selecting the gauge table record and requesting a gauge table to be output in a text file. Further, because Gauge Pro 2 stores the data used to generate the gauge table text file output, the operator may return to the Gauge Pro 2 software any time after the gauge table data has been generated to produce another gauge table text file.

It is appreciated that, depending on the software used to generate the gauge table information, it may be beneficial to use a single computer file to store the information described above with respect to the header information file and the detail information file. Alternatively, it may be beneficial to use more than two computer files to store the information described above with respect to the header information file and the detail information file.

Once the detail information file has been created via step 32, the header information file and the detail information file are checked for errors by the audit program via step 34. The audit program examines the content of the header information file and the detail information file and determines if the data contained in the files is the proper content and in proper form to satisfy the customer's request and to be converted into the desired format. For example, step 34 may include, but is not limited to, determining: whether the tankcar number in the header information file is numeric; whether the tankcar is active, that is, whether the tankcar is currently in use by a customer 12; whether the provider 14 has the mechanical file information for the tankcar; whether the capacity in the header information file is numeric; whether the volume data in the detail information file is numeric; whether the capacity in the header information file matches the capacity in the provider's mechanical file; whether the provider 14 has not already created an accurate gauge table for the tankcar described in the header information file; whether the decimal data is valid, that is, whether the decimal data in the detail information file is "00", "25", "50", or "75"; whether the tankcar's length dimension is not greater than 13' 11.75", i.e., the maximum length of a tankcar; whether the capacity in the detail information file is within 10 gallons of the capacity in the header information file; whether the dimensions are in the proper dimensions, such as for example, inches and gallons; whether a proper gauge table type has been requested; and whether there is an image and an outage detail information file for each corresponding header information file. The audit program utilized in step 34 is intended to reject all information files that are not in proper format for conversion in step 40 as described below. Consequently, the audit program should be designed to correspond directly to the input required for step 40.

The audit program of step 34 may be implemented manually by the operator. Alternatively, a monitoring program may be utilized to automatically implement step 34 when the information files are generated. For example, a program may be implemented to periodically scan the computer storage file where information files are stored and then automatically run the audit program when a new information file is detected in the storage file.

If the audit program finds any errors in any of the information files, an error report is generated via step 36. The error report may include information indicating which files included errors detected by the audit program and which particular errors were detected. Generating the error report via step 36 may include generating a text file that may be accessed by the operator. Alternatively, step 36 may include e-mailing the error report to, or otherwise alerting the operator that entered the data into the information file for each of the information files that contains errors.

If an error report is generated via step 36, the operator may return to step 30 or step 32 as needed to remedy the information file containing the error or errors. The operator may then repeat steps 30 through 34 as needed until the information files determined to be error free by the audit program via step 34.

When an information file passes the audit program in step 34, a date and time stamp may be added to the information file as part of the audit program via step 34.

Once each of the information files are determined to be error free by the audit program via step 34, the data contained in the information files may be reformatted to provide a gauge table in the desired format via step 38. For example, if the information files are created as text files, conversion of the information files via step 38 may include implementing a mapping program to separate the text in the information files into fields to be compiled in a gauge table file. Further, the header information file and the corresponding detail information file may be combined into a single gauge table file as part of step 38. Moreover, each header information file may be combined separately with a corresponding image detail information file and a corresponding outage detail information file to create an image gauge table file and an outage gauge table file. Alternatively, the information files may be combined, or separated, into any number of gauge table files via step 38.

The mapping program implemented as part of step 38 may be used to concurrently reformat and combine the data contained in the information files into a format suitable to facilitate providing the gauge table to the customer 12 in the format requested by the customer. For example, the text fields separated out of the information files by the mapping program may be reformatted into the gauge table file via step 38 in a format suitable to be displayed on an extranet or the Internet. Alternatively, the data in the information files may be reformatted into any format that promotes providing the gauge table to the customer 12 in the format requested by the customer 12.

By way of example, the mapping program of step 38 may be used to generate a gauge table formatted for display on a computer network. In such an embodiment, the mapping program may be used to extract data from the information files and transfer the data to appropriate locations in a form file., i.e., a file containing the necessary programming code for network display, but containing blanks for appropriate data to be inserted. A gauge table file in the proper format is created when the mapping program fills in the blanks in the form file using data from the information files. Alternatively, the mapping program may create a gauge table file via step 38 in any manner apparent to one skilled in the art.

Once the information file data has been reformatted into gauge table files via step 38, the gauge table may be provided to the customer 12 via step 20 as described above with respect to FIG. 2.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A computer-implemented method of providing a gauge table for a railcar tank and an error report comprising the steps of:
   receiving a request to provide a gauge table, including receiving header information including information identifying the railcar, further including a requested format to provide said gauge table;
   generating a detail information file including gauge table data for said gauge table;
   comparing said header information and said detail information file with the received request;
   generating an error report based on the comparison of said header information and said detail information file with the received request;
   using said error report to determine whether either of said header information and said detail information contains one or more errors to be corrected before converting and providing said gauge table;
   converting said gauge table to said requested format; and
   providing said gauge table via said requested format.

2. The method of claim 1 further comprising the step of checking said gauge table for errors.

3. The method of claim 1 wherein said requested format is via a computer network.

4. The method of claim 1 wherein said requested format is via the Internet.

5. The method of claim 1 wherein said gauge table includes image gauge table data and outage gauge table data.

6. The method of claim 1 wherein said request includes information about the requestor.

7. The method of claim 1 wherein said step of converting said gauge table data to said requested format is accomplished via a mapping program.

8. The method of claim 1 wherein said request is made via a computer network.

9. The method of claim 1 wherein said request is made via the Internet.

10. A system for providing a gauge table for a railcar tank and an error report including:
    means for receiving a request to provide a gauge table including receiving header information including information identifying the railcar;
    means for generating a detail information file including gauge table data coupled to said means for receiving a request to provide said gauge table;
    means for comparing said header information and said detail information file with the received request;

means for generating an error report based on the comparison of said header information and said detail information file with the received request and using said error report to determine whether either of said header information and said detail information contains one or more errors to be corrected before converting and providing said gauge table;

means for converting said gauge table data to said gauge table coupled to said means for generating said gauge table data; and means for providing said gauge table coupled to said means for converting said gauge table data to said gauge table.

11. The system of claim 10 further comprising means for checking said gauge table for errors coupled to said means for converting said gauge table data to said gauge table.

12. The system of claim 10 wherein said error report is communicated to an operator of the system.

13. The system of claim 10 further comprising a computer network for providing said gauge table.

14. The system of claim 10 wherein said gauge table data is provided via the Internet.

15. The system of claim 10 further comprising a mapping program for converting said gauge table data to said gauge table.

16. The system of claim 10 further comprising a computer network for communicating said request.

17. The system of claim 16 wherein said computer network comprises the Internet.

18. The system of claim 10 further comprising a computer network wherein said means for receiving a request to provide a gauge table, said means for generating gauge table data, said means for converting said gauge table data to said gauge table, and said means for providing said gauge table are coupled via said computer network.

* * * * *